United States Patent Office 2,714,196
Patented July 26, 1955

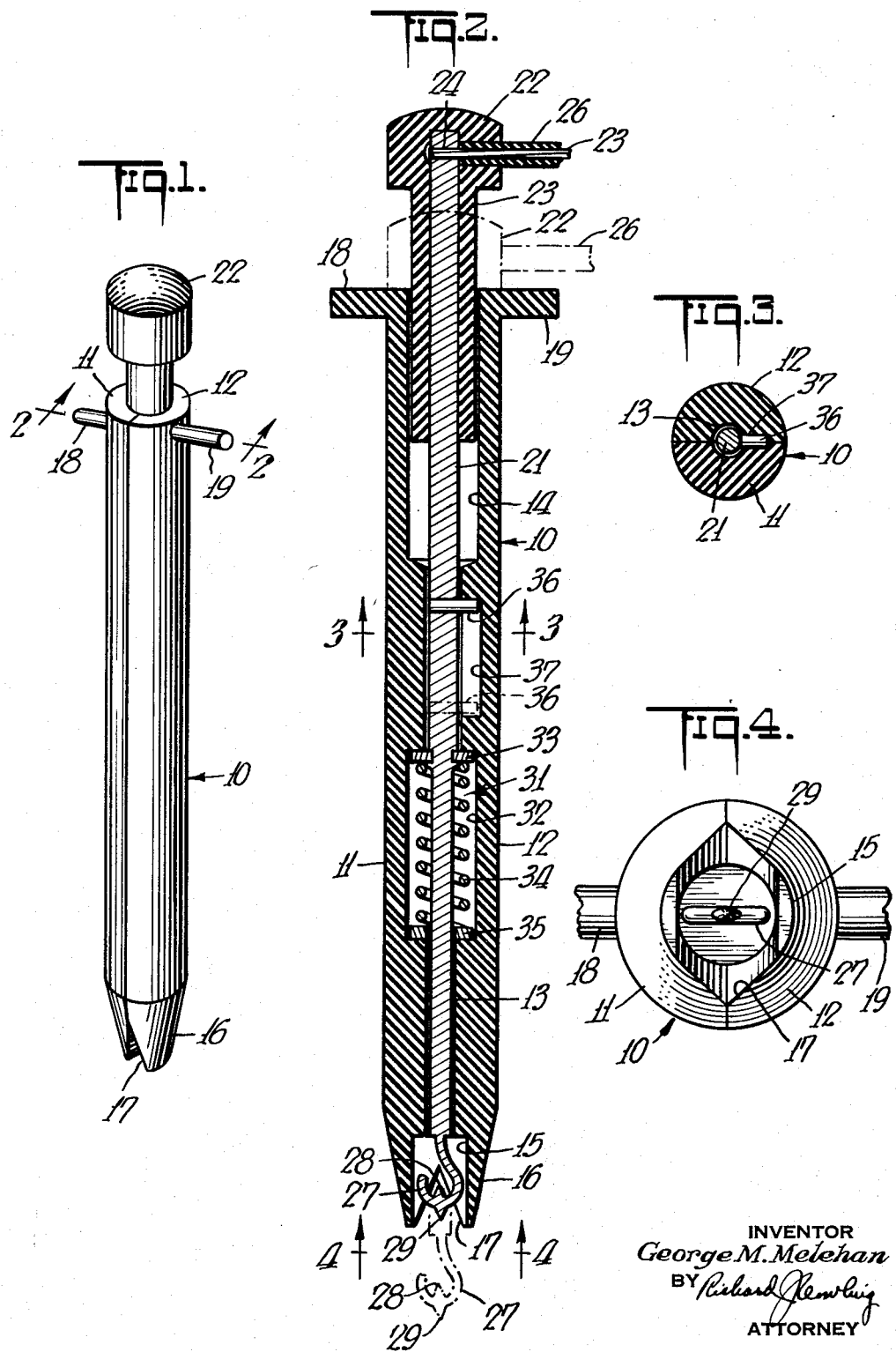

2,714,196

SELF-HOLDING TOOL FOR TESTING ELECTRIC CIRCUITS

George M. Melehan, Lodi, N. J.

Application March 16, 1953, Serial No. 342,325

1 Claim. (Cl. 339—97)

The present invention relates generally to a testing prod and tool of the type used in testing radio and television equipment where the circuits are located in places generally inaccessible to the hands or other conventional tools, and it has particular relation to such a tool that is capable of clamping and holding itself in electrical contact with a wire to be tested, thereby leaving the hands of the operator free for other purposes.

Such tools are normally connected electrically to a voltmeter and similar equipment in order to test the various circuits of radio or television equipment for the purpose of discovering defective equipment, current leaks, loose connections, etc. The tools now on the market are equipped with a pointed or curved end prod, which may be spring pressed into electrical contact with a wire to be tested, but all such tools must be held under continuous pressure by the operator at all times in order to maintain electrical contact. The major disadvantage of these tools is that they cannot be left in electric contact with a circuit being tested, but must be held in position by the hand of the operator while the test is being made, making it exceedingly awkward if not impossible for him to do any other necessary work while a test is being made.

The present invention provides a tool of the character described which is so designed that the aforementioned major disadvantage can be obviated. This tool is capable of holding its prod in electrical contact with a wire being tested, so as to leave the hands of the operator free for other purposes.

One of the objects of the present invention is the provision of a simple, efficient and inexpensive self-holding tool for testing radio and television circuits in inaccessible places.

Another object of the invention is to provide such a tool with not only a simple spring pressed prod which can be held manually in electrical contact with an inaccessible wire, but also a prod which is capable of engaging the wire and holding itself in electrical contact, whereby the hands of the operator are free for other purposes.

A further object of the invention is the provision of a simple, efficient and inexpensive testing tool which is provided with means for facilitating its operation under spring pressure, whereby it may be readily operated quickly and conveniently by a single hand of an operator.

Other and further objects and advantages of the invention reside in the detailed construction of the apparatus, resulting in simplicity, economy and efficiency, which will be apparent from the following description, wherein a preferred form of embodiment of the invention is shown, reference being had to the accompanying drawings, forming a part hereof, in which like numerals indicate like parts.

Figure 1 is a perspective view of a tool constructed in accordance with the principles of the invention with its end testing prod in its normal retracted position;

Figure 2 is a longitudinal sectional view, on an enlarged scale, of the testing tool shown in Figure 1, the same having been taken substantially along the line 2—2 of Figure 1, looking in the direction of the arrows, and showing in dotted lines the position of its respective parts when its testing prod is projected against its normal spring urging means;

Figure 3 is a cross-sectional view of the testing tool shown in Figure 2, the same having been taken substantially along the line 3—3 thereof, looking in the direction of the arrows; and Figure 4 is a bottom plan view of the testing tool shown in Figure 2, the same having been taken substantially along the line 4—4 thereof, looking upwardly in the direction of the arrows into its prod projecting end.

Referring now to the drawings and particularly to Figure 2 thereof, there is shown a main tubular casing 10, which is preferably formed in two identical half-sections 11 and 12 of plastic, hard rubber, fibre or other suitable non-conducting materials that are capable, upon assembly, of being fastened together to form a unitary construction, as by fusing, molding, gluing, etc. The casing 10 has a longitudinal axial bore 13 extending therethrough, which bore is enlarged contiguous to its upper and lower ends, as indicated at 14 and 15 respectively, and the lower end of the casing 10 is tapered, as indicated at 16, and is provided with a diametrically extending slot or notch 17, which is of an inverted V-shaped construction and in open communication with the enlarged lower end bore 15. A pair of lugs 18 and 19 are formed integrally on the sides of the casing 10 contiguous to its top edge and serve as suitable finger anchoring means for facilitating operation of the tool with a single hand of an operator, as will hereinafter be more fully described.

A metal rod 21, which is considerably longer than the casing 10 and preferably made of brass, is mounted slidably within the bore 13 thereof. The rod 21 has a cap 22, which is made of any suitable non-conducting material and preferably of the same material as the casing 10, mounted or molded on the upper end thereof. The cap 22 has an integrally formed and depending sleeve 23 of a reduced cross-section adapted to extend into and fit slidably within the enlarged upper bore 14. A wire 23, connected electrically as by soldering or welding, is fastened to the upper end of the rod 21, as indicated at 24, through the cap 22, and has a portion 26 extending outwardly through said cap 22 for connecting the same with suitable testing equipment (not shown). The lower end of the rod 21 has a conventional hook 27 formed integrally therewith, which hook 27 has a plurality of pointed barbs 28 and 29 projecting outwardly and upwardly and downwardly, respectively, from opposite sides of its lower arcuate portion.

Spring pressure urging means 31 is mounted intermediate the ends of the casing 10 in an enlarged recess 32 extending for a short distance concentrically of its bore 13. The spring pressure urging means 31 consists of a washer 33 welded, soldered or otherwise mounted fixedly to the metal rod 21. A circular compression spring 34 is mounted over the rod 21 below the fixed washer 33. A second washer 35 is mounted freely or floatingly over the rod 21 immediately below the spring 34. The washers 33 and 35 are of a diameter larger than the bore 13 of the casing 10 and the spring 34, but smaller than the enlarged recess 32, the edges of which serve to confine the spring and washer assembly within the limits of said recess. The spring urging means 31 tends to project the rod 21 upwardly whereby its upper end projects above said casing 10 with its cap 22 held in spaced relation therefrom. Obviously, when the rod 21 is projected upwardly under urging of its spring urging means 31, the cap 22 is not only maintained normally a spaced distance above the casing 10 but the hook 27 is withdrawn completely within the confines of the lower enlarged bore 16 and V-shaped notch 17.

There is mounted on the rod 21 between the spring urging means 31 and the lower end of the reduced depending sleeve 23 of the cap 22 a lug 36. The lug 36 is welded or otherwise fixedly secured to the rod 21, and operates in a groove 37 extending a short distance longitudinally and in open communication with the bore 13. The lug 36 and groove 37 cooperate to limit the vertical and circumferential movements of the rod 21 with respect of the casing 10. It is important to limit the vertical movement of the rod 21 with respect of the casing 10 in order that the cap 22 will not be moved too far away from the finger gripping or anchoring means 18 and 19 to prevent manipulation by a single hand of the operator. It is likewise important to prevent the rod 21 from rotating or moving circumferentially within the casing 10 in order that its fixed hooked end 27 does not get out of position with respect of its cooperating inverted V-shaped notch 17. The hook member 27 should always be maintained at right angles to the longitudinal axis of the notch 17, which position is best shown in Figure 2, so that when a wire (not shown) is encircled by the hooked end 27 and it is withdrawn under its normal spring urging means into the inverted V-shaped notch, the wire will extend longitudinally thereof and be capable of being moved tightly into a wedging position with the top or narrow portion of said notch, thereby being maintained in a fixed position until released.

The assembly of the tool, which is made before the sections 11 and 12 are fastened together, has been described sufficiently, it is believed, during the description of the various parts so that further explanation is not required for an understanding of the invention. The tool may be used as a conventional prod to be held in contact at all times by the operator by using its lowermost and downwardly projecting barb 29 as its contacting point. In this arrangement, the operator merely projects the hook 27 out of the casing 10 and pushes the barb 29 through the insulation on the wire of the circuit to be tested and holds it in such position while taking his reading. However, if he wishes to have his hands free for other purposes over a longer period of time while keeping the circuit wire hooked up with the prod, he merely locks his two fingers around the anchoring lugs 18 and 19, and, with the palm of his hand pressing on the top of the cap 22, forces the hooked end 27 of the rod 21 from its notch 17 and enlarged lower bore 15 until he can encircle the wire to be tested with said hooked end. Thereupon, if he releases his grip on the tool, the spring urging means 31 will force the rod 21 upwardly, retracting the hooked end and its encircled wire into the inverted V-shaped notch 17 until the latter engages and lies in the top or narrow portion thereof, whereupon the upwardly projecting barb 28 will puncture the insulation of said wire and make the necessary electrical contact therewith. The tool will hold the wire in contacting position until the operator again pushes down on the cap 22 and the hook 27 emerges from the notch 17, whereupon the wire may be disengaged.

Although I have only described in detail and illustrated in the drawings one form of the invention, it will be readily apparent to those skilled in the art that the same need not be so limited, but that various modifications may be made therein without departing from the spirit thereof.

What I claim is:

An electric testing tool comprising a hollow cylindrical casing made of non-conducting material having finger grip means projecting outwardly adjacent its upper end and having an axial bore extending therethrough, said bore being substantially enlarged at its upper end and having a transverse slot connecting with its lower end, a metal rod mounted slidably within said bore and having a hook on its lower end, said rod being longer than said casing, means including a spring mounted within said casing for urging said rod normally upwardly whereby its upper end projects above said casing and its lower hooked end is withdrawn within said slot, means for limiting the movement of said rod within said bore, a cap of non-conducting material mounted over the upper end of said rod and spaced from said casing, said cap having a reduced depending sleeve formed integrally therewith adapted to fit slidably within said enlarged upper bore, and a wire connected to the upper end of said rod and extending outwardly through said cap, the lower end of said rod having a hook for encircling a wire, said hook having barbs projecting upwardly and downwardly from opposite sides of its lower arcuate portion.

References Cited in the file of this patent

UNITED STATES PATENTS

| | | |
|---|---|---|
| 2,438,350 | Reichard | Mar. 23, 1948 |
| 2,516,657 | Spendlove | July 25, 1950 |